United States Patent [19]
Carpenter

[11] 3,897,116
[45] July 29, 1975

[54] BEARING WEAR DETECTOR

[75] Inventor: Richard G. Carpenter, Horsham Township, Montgomery County, Pa.

[73] Assignee: Crane Co., New York, N.Y.

[22] Filed: Mar. 19, 1973

[21] Appl. No.: 342,663

Related U.S. Application Data

[63] Continuation-in-part of Ser. No. 187,266, Oct. 7, 1971, abandoned.

[52] U.S. Cl. ............... 308/1 A; 340/269; 200/61.4
[51] Int. Cl. ........................................... F16c 41/00
[58] Field of Search ............ 308/1 A; 184/1 C, 1 B; 340/269, 282; 200/61.4

[56] References Cited
UNITED STATES PATENTS

| | | |
|---|---|---|
| 449,411 | 3/1891 | Hannah .............................. 200/61.4 |
| 3,102,759 | 9/1963 | Stewart ............................... 340/269 |
| 3,108,264 | 10/1963 | Hernoo ............................... 340/269 |
| 3,183,043 | 5/1965 | Creega ............................... 340/269 |
| 3,223,795 | 12/1965 | Yerman ............................. 200/61.4 |
| 3,373,300 | 3/1968 | Sullivan .............................. 340/269 |

FOREIGN PATENTS OR APPLICATIONS

| | | | |
|---|---|---|---|
| 88,470 | 11/1921 | Germany ........................... 308/1 A |
| 148,914 | 3/1937 | Austria ............................... 340/269 |
| 48,123 | 7/1919 | Sweden .............................. 340/269 |
| 336,660 | 5/1921 | Germany ........................... 340/269 |

*Primary Examiner*—Charles J. Myhre
*Assistant Examiner*—R. H. Lazarus
*Attorney, Agent, or Firm*—George S. Schwind

[57] ABSTRACT

A bearing wear detector is provided for a shaft supported in a bearing whose wear is to be monitored. The detector includes a metallic member carried by the shaft and other metallic member in fixed spaced relationship to the shaft carried member, one of the members having an insulating coating. Bearing wear causes the insulating coating to be worn through, and metallic contact of the members is made so that an alarm circuit is thereby completed.

5 Claims, 6 Drawing Figures

PATENTED JUL 29 1975 3,897,116

SHEET 1

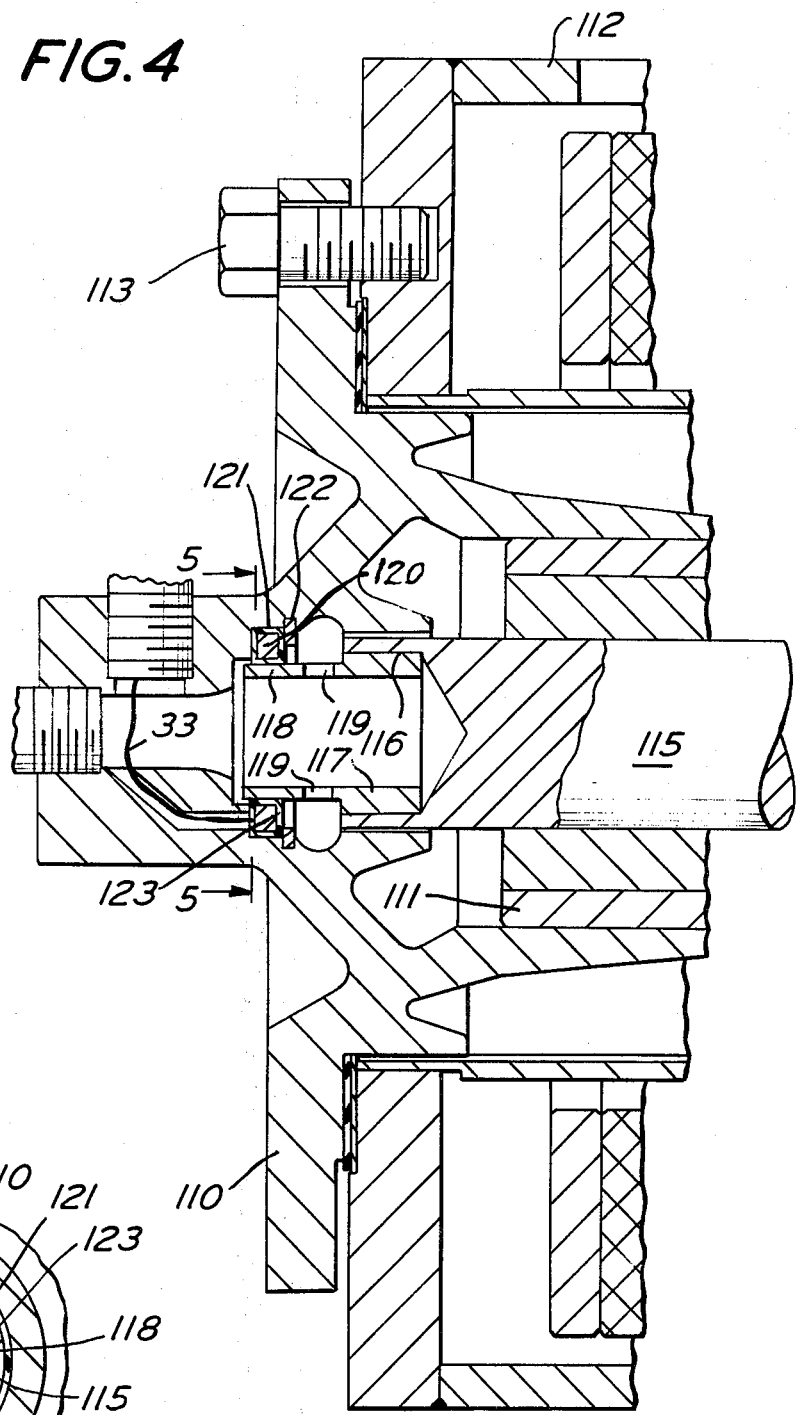
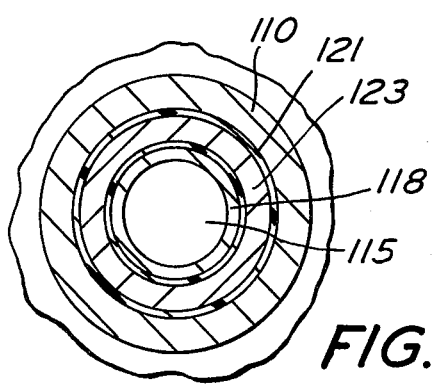
FIG. 4
FIG. 5

BEARING WEAR DETECTOR

FIELD OF THE INVENTION

This invention relates to a bearing wear indicator of the type wherein wear of the bearing causes metallic contact of a shaft carried member and a fixed member for completion of an alarm circuit and is a continuation-in-part of my application of same title bearing Ser. No. 187,266, filed Oct. 7, 1971, and now abandoned.

DESCRIPTION OF THE PRIOR ART

Wear indicators for bearings have been in common use for some time since bearing failure in expensive machinery, if undetected or not detected quickly enough, can cause the equipment to be severely damaged or destroyed.

One such detector is shown in the U.S. Pat. to Lawrence, No. 1,001,152 wherein a fixed ring surrounds the end of an armature shaft with the ring carrying inwardly facing spaced screws which have hollow bores carrying springs which bear against contact elements held in place by low melting point solder. Looseness of the shaft bearings or excessive heat and melting of the solder causes contact of the shaft with the contact elements which activates an alarm.

The U.S. Pat. to Heinoo, No. 3,108,264 shows a bearing wear sensor which includes a two condition alarm mechanism whereby two sets of wires are disposed annularly around a shaft with contact of the inner wire with the shaft indicating predetermined bearing wear and contact of the outer wire indicating a more pronounced wear. The contact of the shaft with the outer wire will cause a circuit to shut down the machine.

The U.S. Pat. to Yuan-Heng Dschen, No. 3,176,286 illustrates apparatus for monitoring bearings and particularly gas bearings which includes an end flange on a shaft surrounded by an annulus of insulating material with a metallic layer thereon facing the flange.

Capacitance measuring circuitry is provided and the changes in the air gap between the flange and the metallic layer are monitored as well as the air gap in the other bearings so that a capacitance change due to air gap change indicating bearing wear or failure is noted on suitable monitoring equipment.

The apparatus of the invention does not require expensive and complicated monitoring equipment and provided a simple apparatus with easily replaceable components for determining bearing wear.

A SUMMARY OF THE INVENTION

A bearing wear detector is provided which includes a metallic member carried by a shaft, and metallic member fixedly but removably carried by a housing, and in spaced relation to the shaft carried member with an insulating covering on the exterior of one member so that when the shaft moves excessively due to bearing wear the contact wears through the insulating covering and metal contact occurs to complete an alarm circuit.

The principal object of the invention is to provide a bearing wear detector wherein excessive bearing wear is quickly determined.

A further object of the invention is to provide a bearing wear detector which is simple and inexpensive to construct but reliable in operation.

A further object of the invention is to provide a bearing wear detector which has easily replaceable components.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 4 is a central sectional view of another embodiment of the bearing wear detector;

FIG. 5 is a vertical sectional view taken approximately on the line 5—5 of FIG. 4; and, FIG. 6 is a perspective assembly view of still another embodiment of the bearing wear detector.

It should, of course, be understood that the description and drawings herein are illustrative merely and that various modifications and changes can be made in the structure disclosed without departing from the spirit of the invention.

DESCRIPTION OF THE PREFERRED EMBODIMENT

Figure 2:
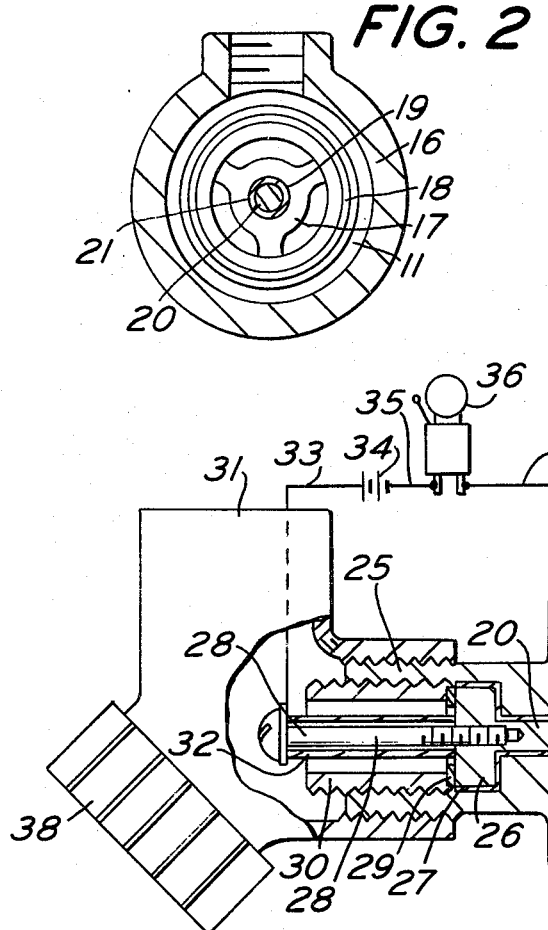
FIG. 2 is a vertical sectional view taken approximately on the line 2—2 of FIG. 1.
Figure 1:
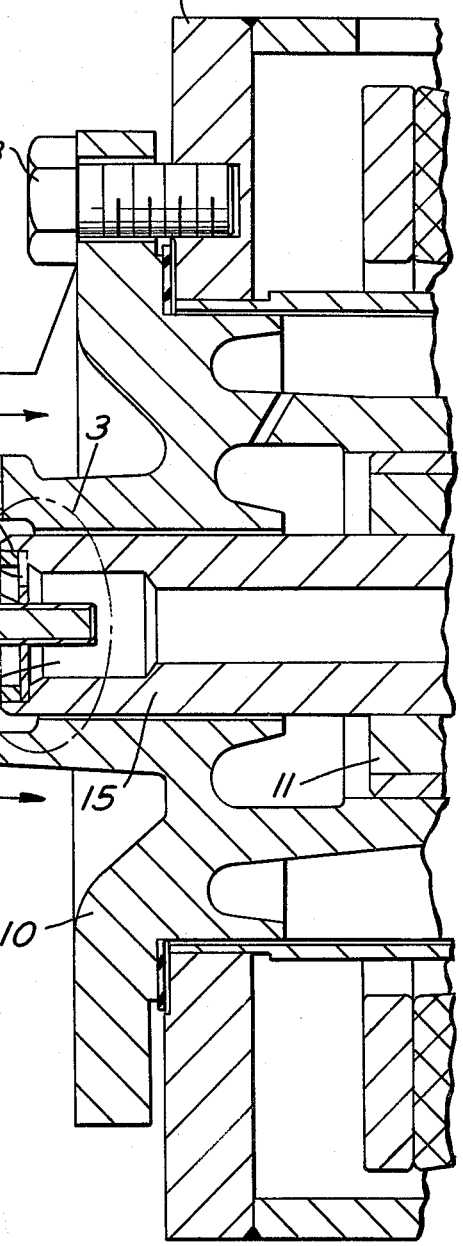
FIG. 1 is a central sectional view of one embodiment of the bearing wear detector.
Figure 3:
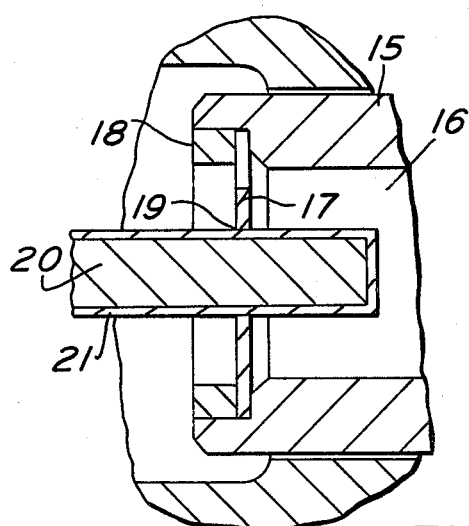
FIG. 3 is an enlarged view of a portion of the apparatus of FIG. 1.

Referring now more particularly to the drawings, and FIGS. 1–3 thereof, one embodiment of a bearing wear detector is shown which includes a housing 10 of conventional type with bearing 11 carried therein and which is illustrated as being of the carbon graphite type but the apparatus is not limited to use with this type of bearing.

The bearing housing 10 can serve as an end closure for a motor housing 12 and is held thereto by bolts 13 in a conventional well known manner.

A rotatable shaft 15 is carried by the bearing 11 and has a recess 16 in its left end as shown in FIG. 1, with a metallic disc 17 therein, which can be in the form of a spider for fluid flow therethrough and is retained by an outer ring 18.

The disc 17 has a central opening 19 therein into which a metallic pin 20 extends and into recess 16 in close non-contacting relatonship.

The pin 20 has an outer boot or coating 21 thereon of teflon or other suitable insulating material, and which if a boot may be molded in place or held in place by adhesive or by shrinkage.

The pin 20 is carried at its left as seen in FIG. 1 in a rear portion 25 of bearing housing 10 and has a head 26 in recess 27. A screw is in threaded engagement in head 26 of pin 20 retaining it in place. An insulating washer 29 abuts pin head 26 with another retaining bushing 30 in threaded engagement with housing 25 and holding the washer 29 in place. A conductor housing 31 with removable cap 38 is provided in threaded engagement with housing 25 and extends around the outside thereof.

The screw 28 is provided with a sleeve 32 of insulating material and has a conductor 33 of an alarm circuit connected thereto. The conductor 33 is connected to a source 34 of electrical energy and has a conductor 35 connected to the source and to one terminal of signal device such as an alarm which may be a bell 36 or other suitable apparatus.

The other terminal of the bell 36 has a conductor 37 connected thereto and to bolt 13 and the housing 10.

The mode of operation will now be pointed out.

The shaft 15 as it rotates in bearing 11 causes the bearing to wear and in time the end of the shaft 15 will tend to move downwardly until the boot 21 on pin 20 is contacted by the disc 17. Further frictional contact causes the coating 21 to be worn at the location of the frictional contact until the disc 17 and pin 20 engage. A circuit is thereby completed through the pin 20, screw 28, conductor 33, electrical energy source 34, conductor 35, bell 36, conductor 37, and through the housing 10 and shaft 15. In a specific embodiment the clearance between the disc 17 and the pin 20 is such that bearing wear of the order of 14 one-thousandths of an inch is effective for the frictional abrasion of the coating.

A sounding of the bell 36 thereby signals excessive bearing wear. After the bearing 11 has been replaced, the apparatus is easily placed in condition for future bearing wear detection by removing screw 28 from worn pin 20 and replacement of pin 20 with a new one.

Referring now to FIGS. 4 and 5, another embodiment of the invention is illustrated which includes a bearing housing 110 with a bearing 111 carried therein and which can be of any suitable type. The bearing housing 110 serves as an end closure for a motor housing 112 and is held thereto by bolts 113. A rotatable shaft 115 is carried by the bearing 111 and has a recess 116 in its left end as shown in FIG. 1.

A metallic sleeve 117 is secured in the recess 116 such as by welding and had a portion 118 of lesser diameter with hole 119 therethrough. A metallic ring 120 surrounds one end of the portion 118 of the sleeve in close non-contacting relationship, and is secured in a recess 121 of housing 110 by a retaining ring 122.

A coating 123 of teflon or other suitable insulating material is provided on the ring 120. Suitable electrical connections (not shown) but similar to those previously described, are provided which extend to an alarm system as desired.

In operation excess wear of bearing 111 will permit portion 118 of sleeve 117 to contact the coating 123 on ring 120 and repeated rubbing contact will wear away the coating 123 until contact is made between the ring 120 and portion 118. This metallic contact will complete the circuit (not shown) and cause the alarm system to indicate the bearing wear.

Figure 6:
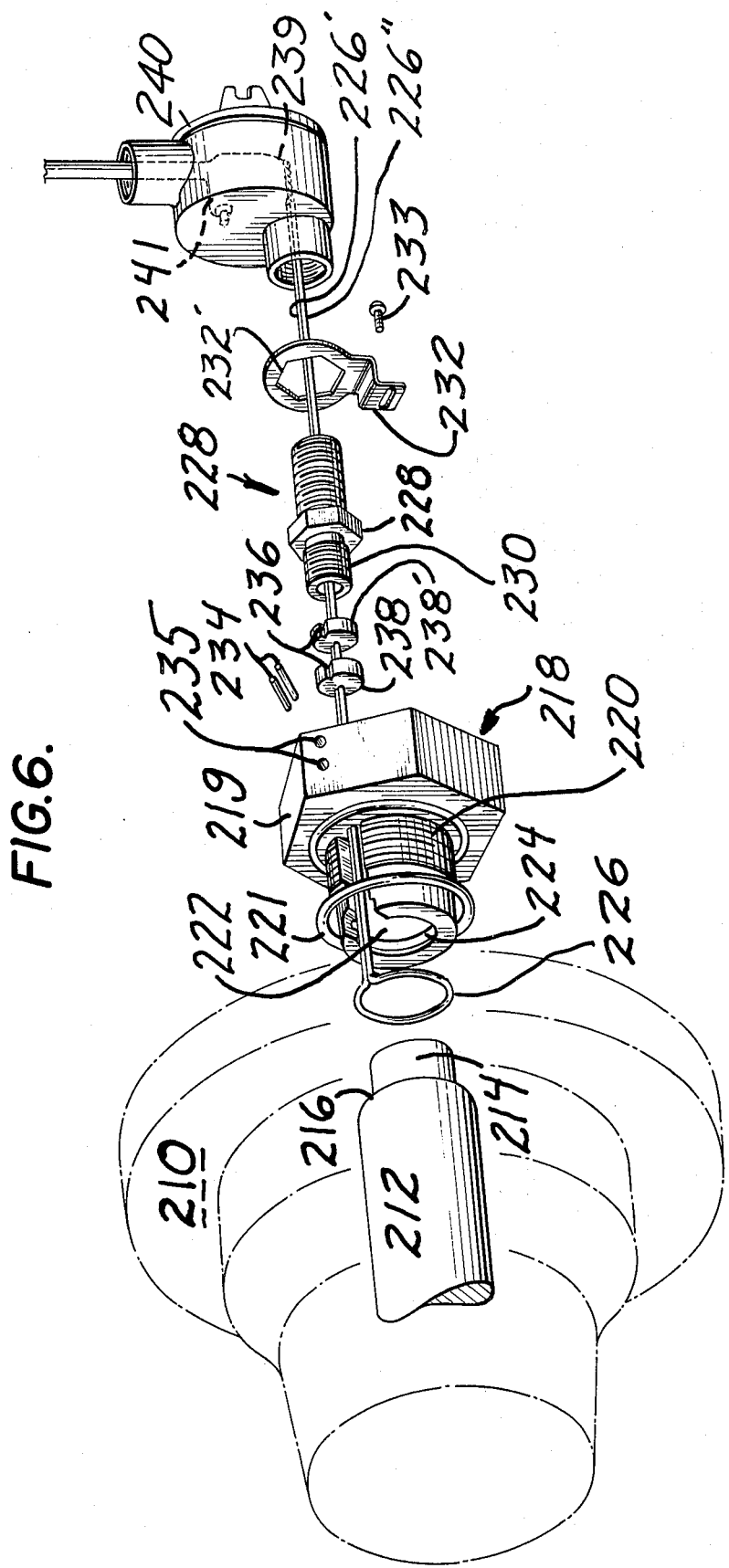

FIG. 6 shows still another embodiment of the proposed bearing wear detector which utilizes a formed wire, which is insulated by a covering of TFE, plastic, or similar material, as a means of conveying the detection of a wear in the bearing when the covering has worn through to the bare wire. Rear bearing housing 210 has a motor shaft 212 rotating therein which has a reduced portion 214 providing a shoulder 216. A wire retainer holder 218 comprising a plug having hexhead portion 219 and integral threaded shank 220 is adapted to the threadedly engaged into the rear bearing housing 210. The shank portion 220 has a cylindrical recess 222 therein which is adapted to receive the end portion 214 of motor shaft 212, as shown. A circumferential groove 224 is positioned within the cylindrical recess 222 and in adapted to receive a ring-like formed insulated covered wire 226 within the said groove. Although the assembly drawing shows the formed wire 226 projecting between the shaft and the wire retainer holder 218, it is understood that the wire 226 is formed into a ring so as it will encircle the shaft end 214 and will be retained within the groove 224 when the holder 218 is inserted and positioned within the bearing housing. An "O" ring 221 is interposed between the housing 210 and hexhead 219 to prevent leakage of fluid therethrough. The formed wire 226, which is a loop and which encircles the shaft has two leads 226', 226" extending through the wire retainer holder 218 and a connector 228, the latter having a hollow shank portion 230 which is adapted to be threadedly engaged into the wire retainer holder 218. Locking device 232 is affixed to the wire retainer holder 218 by screw 233 to thus prevent relative rotation between connector 228 locking device 232 and retainer holder 218. Connector 228 has an integral nut portion 228' which mates with the internal portion 232' of locking device 232. Thus, relative rotation between said element is prevented when the locking element 232 is affixed to the said holder 218, as clearly shown. Roll pins 234 are radially inserted into drilled holes 235 of the wire retainer holder 218 and are positioned in slots 236 of back-up discs 238, 238' when the connector 228 is advanced into position into the wire retainer holder 218. Disc 238 is formed of teflon or similar material which functions to seal any leakage of fluid through connector 228 when the same is threadedly advanced into wire retainer holder 218 whereby disc 238 is advanced into position by metal disc 238' interposed between elements 238 and 228. The ends of wires 226', 226" are twisted together to form an electrical connection, as shown in dotted lines within the conduit box 240, so that the loop formed by the covered wire forms a single wire 239 as it emerges from the said conduit box. The other wire 241 is grounded to the conduit box whereby the two wires 239, 241 emerging therefrom are connected to an alarm system of any desired type which will be triggered when the covered form portion 226 of the wire is worn through by the motor shaft 214 in the event of bearing wear whereby an electrical circuit is completed through ground, enabling an alarm to be activated.

It is thus seen that the above embodiments enable bearing wear to be detected at any peripheral point since the detector element is located peripherally and wear in any direction will complete the circuit. Since the direction of thrust changes and bearing wear changes in operating head and flow, the novel means of detecting wear is appreciated.

I claim:

1. In combination with a bearing and rotating shaft assembly, a wear detector, said wear detector comprising a closed electrically conductive wire loop, an insulated covering on said wire loop, a holder, said holder including a mounting shank terminating in a recessed end positioned about an end portion of the shaft in outwardly spaced relation thereto, the covered loop being positioned within said recessed end for mounting thereby in outwardly spaced surrounding relation to the end portion of the shaft, said insulated covering insulating said loop from the shaft completely thereabout for abrasion by the shaft upon radial displacement of said shaft in any direction upon a wearing of the bearing to effect an electrical connection between the shaft and wire loop, conductor leads extending from said loop, and alarm means electrically engaged with said leads.

2. The combination of claim 1 including a housing about said bearing and shaft assembly, said holder shank being mounted through said housing, and a manipulating head portion on the opposite end of the shank from the recessed end.

3. The combination of claim 2 including sealing means in said holder precluding fluid leakage therethrough.

4. The combination of claim 3 wherein said conductor leads extend longitudinally through said holder and head portion thereon.

5. The combination of claim 4 including a circumferential groove within said recess, said wire loop being received within said groove.

* * * * *